United States Patent
Won et al.

(10) Patent No.: US 10,683,947 B2
(45) Date of Patent: Jun. 16, 2020

(54) SAFETY VALVE AND GAS CYLINDER HAVING SAME

(71) Applicant: OJC CO., LTD., Seoul (KR)

(72) Inventors: Se Kyung Won, Incheon (KR); Min Cheol Kim, Bucheon-si (KR); Min Gyu Kang, Ansan-si (KR); Tack Jin Oh, Incheon (KR)

(73) Assignee: OJC CO., LTD., Seoul (KR)

( * ) Notice: Subject to any disclaimer, the term of this patent is extended or adjusted under 35 U.S.C. 154(b) by 0 days.

(21) Appl. No.: 16/088,991

(22) PCT Filed: Jun. 30, 2016

(86) PCT No.: PCT/KR2016/007058
§ 371 (c)(1),
(2) Date: Sep. 27, 2018

(87) PCT Pub. No.: WO2017/171143
PCT Pub. Date: Oct. 5, 2017

(65) Prior Publication Data
US 2019/0120394 A1      Apr. 25, 2019

(30) Foreign Application Priority Data

Mar. 28, 2016   (KR) .................. 10-2016-0036762

(51) Int. Cl.
*F16K 17/38* (2006.01)
*F17C 13/04* (2006.01)
(Continued)

(52) U.S. Cl.
CPC ............ *F16K 17/386* (2013.01); *B05B 12/12* (2013.01); *B65D 83/70* (2013.01); *F16K 17/30* (2013.01);
(Continued)

(58) Field of Classification Search
CPC ....... F16K 17/386; F16K 17/30; B65D 83/70; F17C 13/04; F17C 13/12
(Continued)

(56) References Cited

U.S. PATENT DOCUMENTS 1,636,065 A *   7/1927   Mueller ................ F16K 17/383
                                                        137/73
5,472,008 A    12/1995   Boarin
(Continued)

FOREIGN PATENT DOCUMENTS

CN         2048924 U      12/1989
CN        101260948 A      9/2008
(Continued)

OTHER PUBLICATIONS

Office Action issued in corresponding Japanese Patent Application No. 2019-501883, dated Sep. 10, 2019 (6 pages).
(Continued)

*Primary Examiner* — P. Macade Nichols
(74) *Attorney, Agent, or Firm* — Osha Liang LLP

(57) ABSTRACT

Disclosed herein is an invention related to a safety valve and gas cylinder having the same. The disclosed safety valve includes a valve part configured to discharge gas filled in a main body, and a blocking part disposed in the valve part and configured to block a gas flow path in accordance with a temperature and pressure inside the main body.

13 Claims, 5 Drawing Sheets

(51) Int. Cl.
    *F17C 13/12*     (2006.01)
    *F24C 3/00*     (2006.01)
    *B65D 83/70*     (2006.01)
    *B05B 12/12*     (2006.01)
    *F16K 17/30*     (2006.01)

(52) U.S. Cl.
    CPC .............. *F17C 13/04* (2013.01); *F17C 13/12* (2013.01); *F24C 3/00* (2013.01)

(58) Field of Classification Search
    USPC .......................................................... 137/74
    See application file for complete search history.

(56) References Cited

U.S. PATENT DOCUMENTS

| | | |
|---|---|---|
| 5,787,918 A | 8/1998 | Jensen |
| 9,562,619 B2 | 2/2017 | Kojima et al. |
| 2005/0217725 A1 | 10/2005 | Moore et al. |

FOREIGN PATENT DOCUMENTS

| | | |
|---|---|---|
| CN | 104896164 A | 9/2015 |
| JP | H08145298 A | 6/1996 |
| JP | 2000002353 A | 1/2000 |
| JP | 2001252366 A | 9/2001 |
| JP | 3811675 B2 | 8/2006 |
| KR | 10-2005-0092527 A | 9/2005 |
| KR | 10-2008-0093807 A | 10/2008 |
| KR | 20140105690 A | 9/2014 |
| KR | 101572626 B1 | 11/2015 |
| KR | 10-2016-0011134 A | 1/2016 |
| WO | 2016013783 A1 | 1/2016 |

OTHER PUBLICATIONS

International Search Report issued in PCT/KR2016/007058 dated Dec. 19, 2016 (2 pages).
Written Opinion of the International Searching Authority issued in PCT/KR2016/007058 dated Dec. 19, 2016 (6 pages).
Office Action issued in corresponding Chinese Application No. 201680084036.X, dated Nov. 27, 2019 (13 pages).

\* cited by examiner

SAFETY VALVE AND GAS CYLINDER HAVING SAME

TECHNICAL FIELD

The present invention relates to a safety valve and a gas cylinder having the same, and more particularly, to a safety valve, which is capable of blocking a flow path in accordance with temperature and pressure, thereby extinguishing fire of a gas stove, and a gas cylinder having the same.

BACKGROUND ART

Generally, examples of a portable gas cylinder include a portable butane gas cylinder which is filled with a butane gas mixture having butane gas as a main ingredient among liquefied petroleum gases and is used in a portable gas stove, and an aerosol cylinder such as a hair spray, an insecticide spray, and a lacquer spray which uses a liquefied petroleum gas or the like as a propellant. Such portable gas cylinders use a gas pressure in the cylinder to extrude content therein to the outside, and a pressure at a certain level or higher is always acting therein.

When a butane gas cylinder receives high heat from the surroundings in a distribution process or during use, a pressure of liquefied gas inside the butane gas cylinder rises and the butane gas cylinder explodes. Particularly, in the case of a butane gas cylinder used in a portable gas stove, when the butane gas cylinder is atypically used without abiding by safety regulations during use, or a high temperature or a pressure at a certain level or higher is acted on the butane gas cylinder and thus a pressure therein is increased, the cylinder may be deformed or damaged, or in worse cases, may explode.

The related prior art includes Korean Utility Model Application Publication No. 2005-0092527 (Sep. 22, 2005, Title of Invention: Portable Gas Cylinder).

DISCLOSURE

Technical Problem

The present invention is directed to providing a safety valve, which is capable of blocking a flow path in accordance with temperature and pressure inside a main body, thereby extinguishing fire of a gas stove and preventing a safety accident, and a gas cylinder having the same.

Technical Solution

One aspect of the present invention provides a safety valve including a valve part configured to discharge gas filled in a main body and a blocking part disposed in the valve part and configured to block a gas flow path in accordance with a temperature and pressure inside the main body.

The blocking part may include an opening/closing flow path part disposed inside the valve part, a blocking pin member disposed in the opening/closing flow path part, an according blocking part formed in the blocking pin member and configured to cause the blocking pin member to block the opening/closing flow path part in accordance with the temperature inside the main body, and a separation preventing cap disposed at an end of the valve part and configured to prevent separation of the blocking pin member.

The according blocking part may form a clearance which is formed in the blocking pin member and through which a gas flow is possible and may be molten when the temperature inside the main body reaches a set temperature.

The according blocking part may include an adhering inclined surface formed at the blocking pin member and a gas distributing member formed at the adhering inclined surface.

The blocking part may include an auxiliary airtight part, and the auxiliary airtight part may include a first auxiliary airtight step formed at an inner surface of the opening/closing flow path part and a second auxiliary airtight step formed at a peripheral surface of the blocking pin member so as to correspond to and come into contact with the first auxiliary airtight step.

A center ring fixing rib configured to prevent eccentricity of the blocking pin member at the opening/closing flow path part may be formed at the peripheral surface of the blocking pin member.

An extending rib part configured to improve an adhesive force with which the opening/closing flow path part comes into contact with the according blocking part may be further disposed in the opening/closing flow path part.

Another aspect of the present invention provides a gas cylinder having a safety valve including a dome coupled to a main body, an upper cap coupled to the dome, the safety valve of claim 1 disposed in the upper cap, and a gas releasing part configured to release overpressure gas of the main body to the outside in accordance with the safety valve.

The gas releasing part may include a plurality of pattern groove parts formed at an edge of the dome and configured to burst in accordance with deformation of the dome upon occurrence of overpressure in the main body.

Advantageous Effects

When a safety valve and gas cylinder having the same according to the present invention are atypically used without abiding by safety regulations such that a temperature inside a main body rises and overpressure occurs, an according blocking part can be softened in accordance with the temperature rise and block a flow path so that a fire source of a gas stove can be removed, thereby preventing continuous temperature rise and overpressure. Therefore, explosion of the gas cylinder can be prevented.

Further, according to the present invention, when secondary temperature rise and overpressure occur due to radiant heat of a cooking appliance, overpressure gas can be discharged to the outside through a gas releasing part, which bursts due to deformation of a dome, thereby preventing explosion of the main body.

MODES OF THE INVENTION

Figure 1:
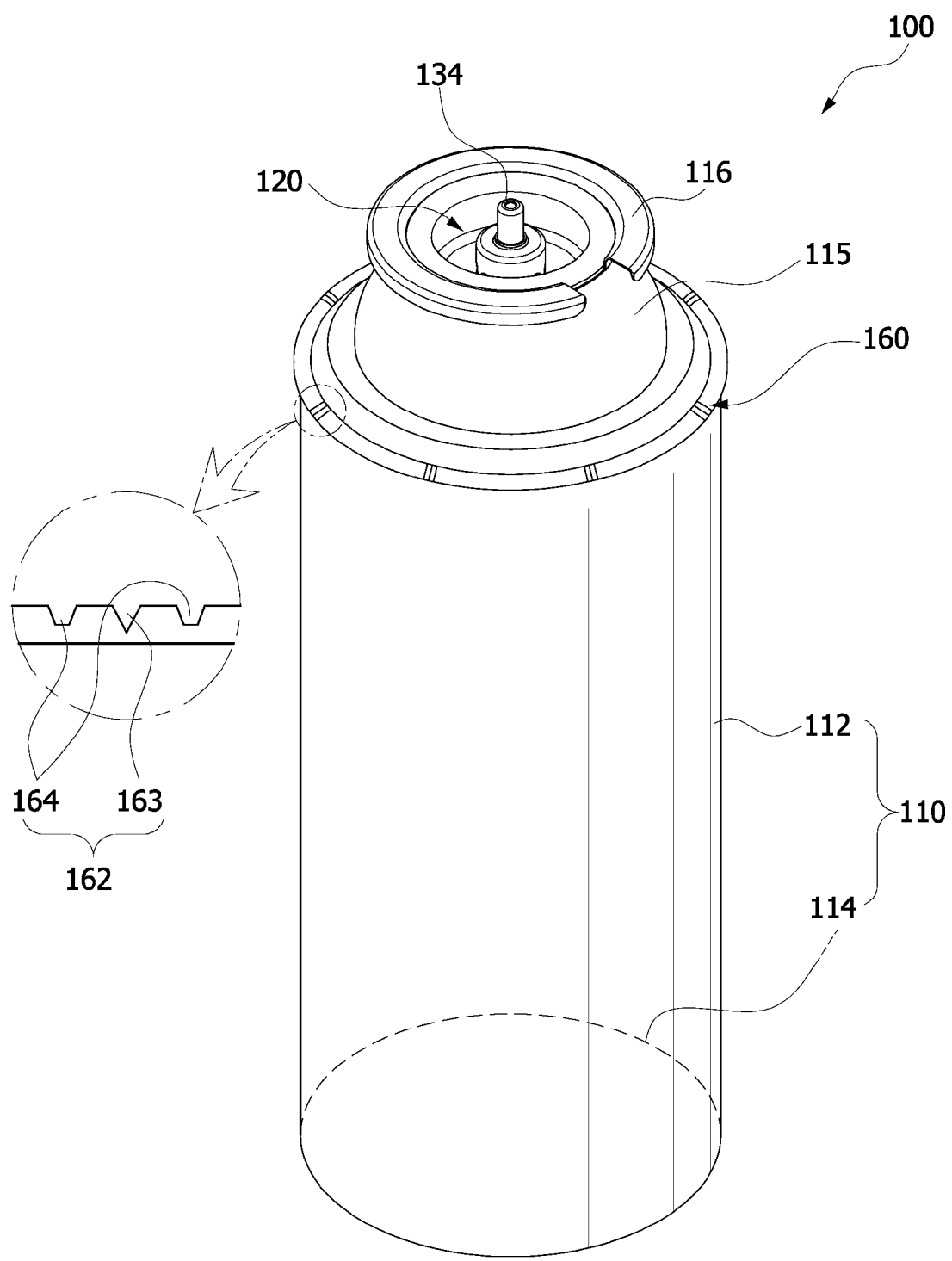
FIG. 1 is a perspective view illustrating a gas cylinder according to an embodiment of the present invention.

Hereinafter, an embodiment of a safety valve and gas cylinder having the same according to the present invention will be described with reference to the accompanying drawings.

In this process, the thickness of lines or the size of elements illustrated in the drawings may be exaggerated for clarity and convenience of description. Further, terms which will be described below are those defined in consideration of functions in the present invention and thus may vary according to an intention or practice of a user or an operator. Therefore, such terms should be defined on the basis of contents throughout the present specification.

Figure 2:
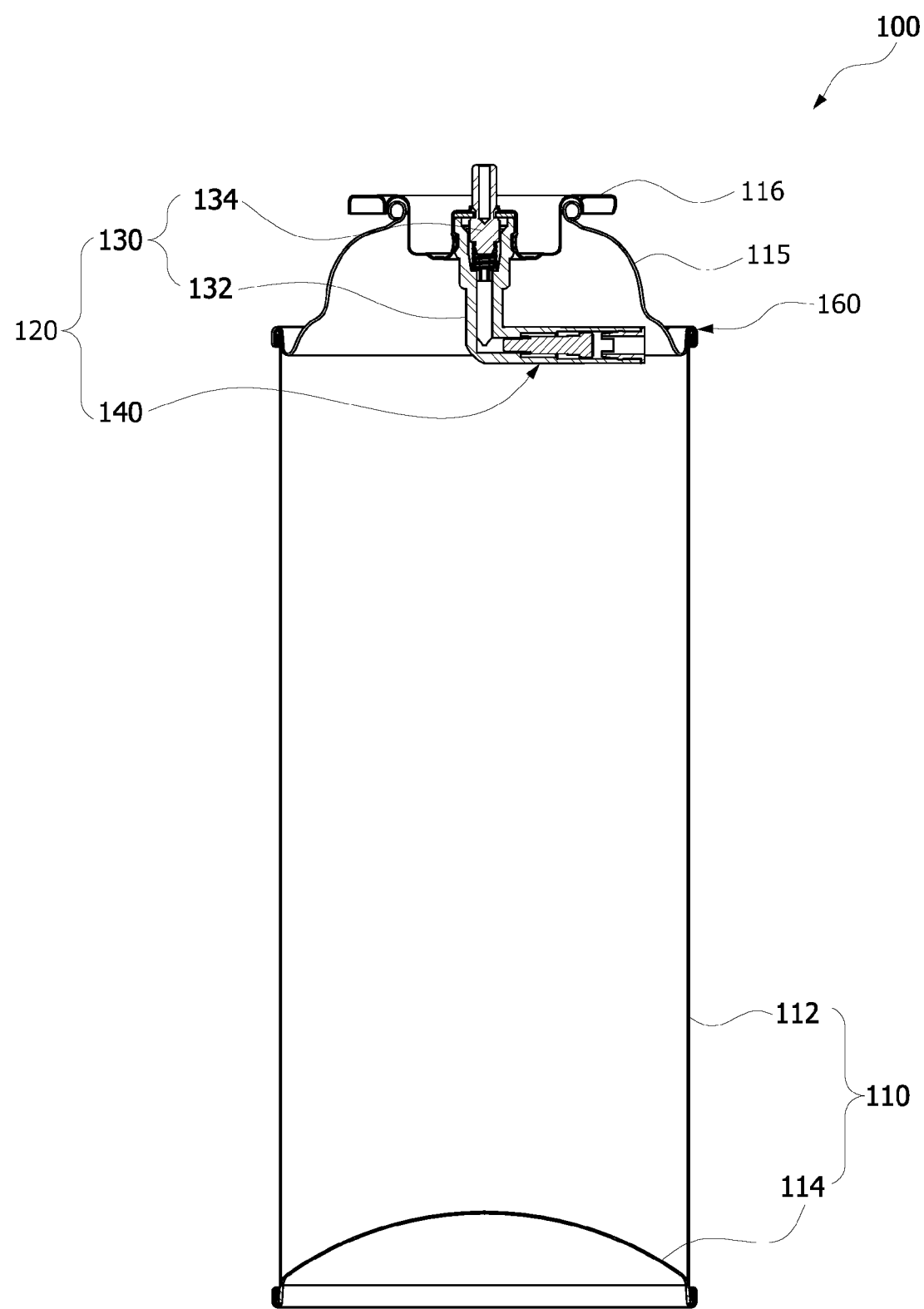
FIG. 2 is a cross-sectional view of the gas cylinder according to an embodiment of the present invention.
Figure 3:
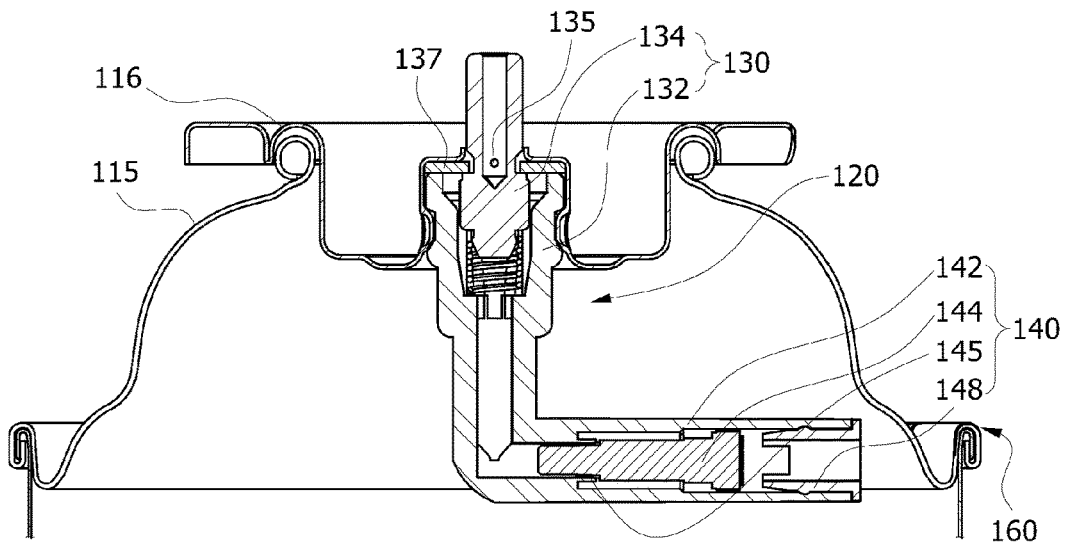
FIG. 3 is a cross-sectional view illustrating a safety valve according to an embodiment of the present invention.
Figure 4:
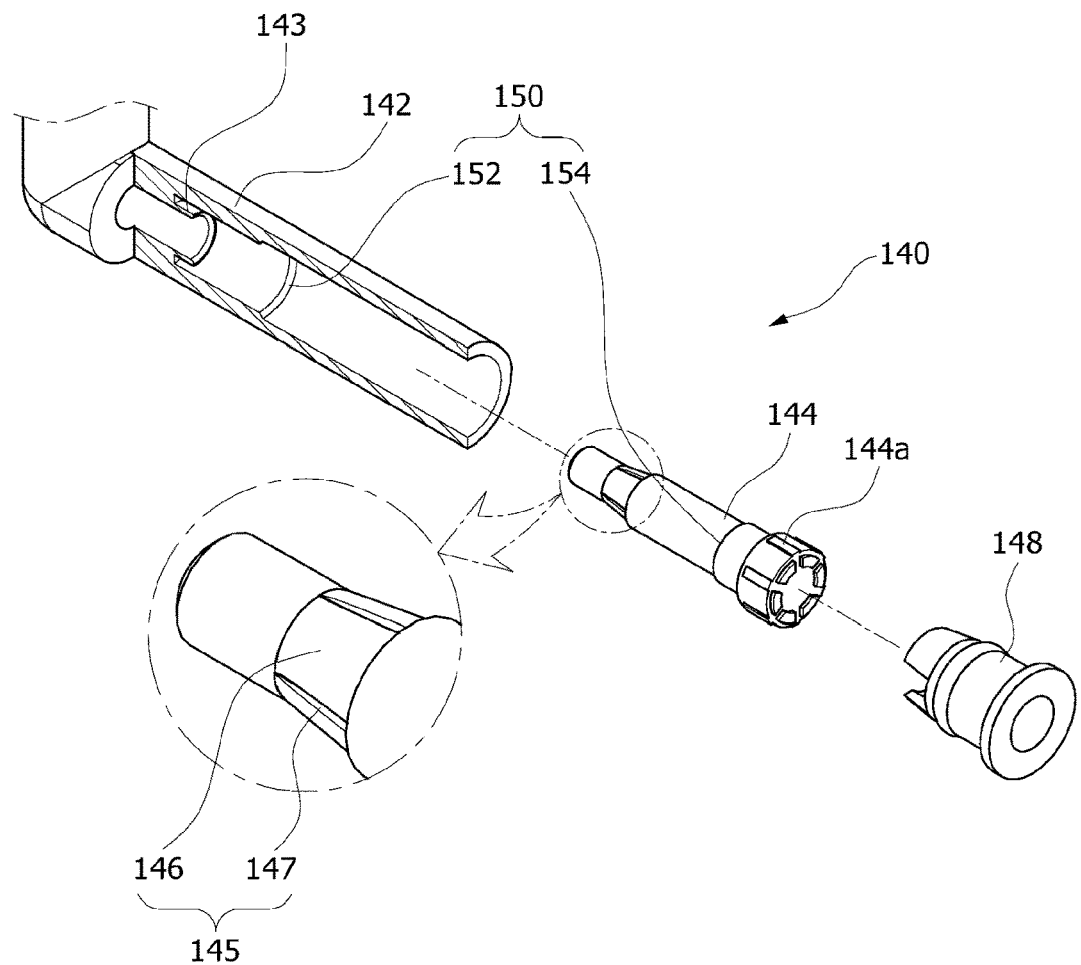
FIG. 4 is a view illustrating a blocking part of the safety valve according to an embodiment of the present invention.
Figure 5:
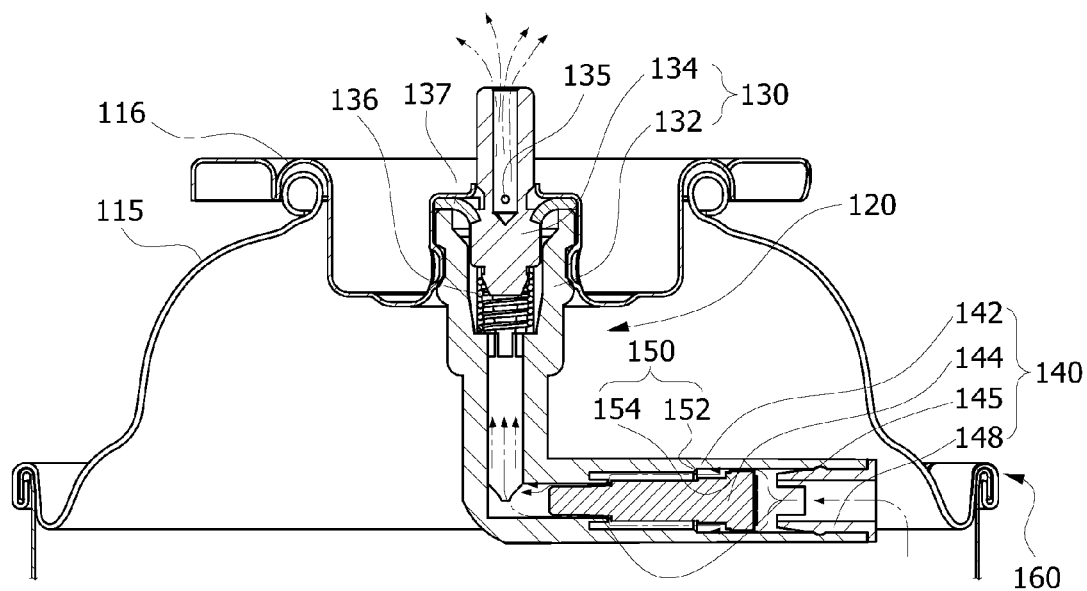
FIG. 5 is a cross-sectional view illustrating a state in which the safety valve according to an embodiment of the present invention is in normal use.
Figure 6:
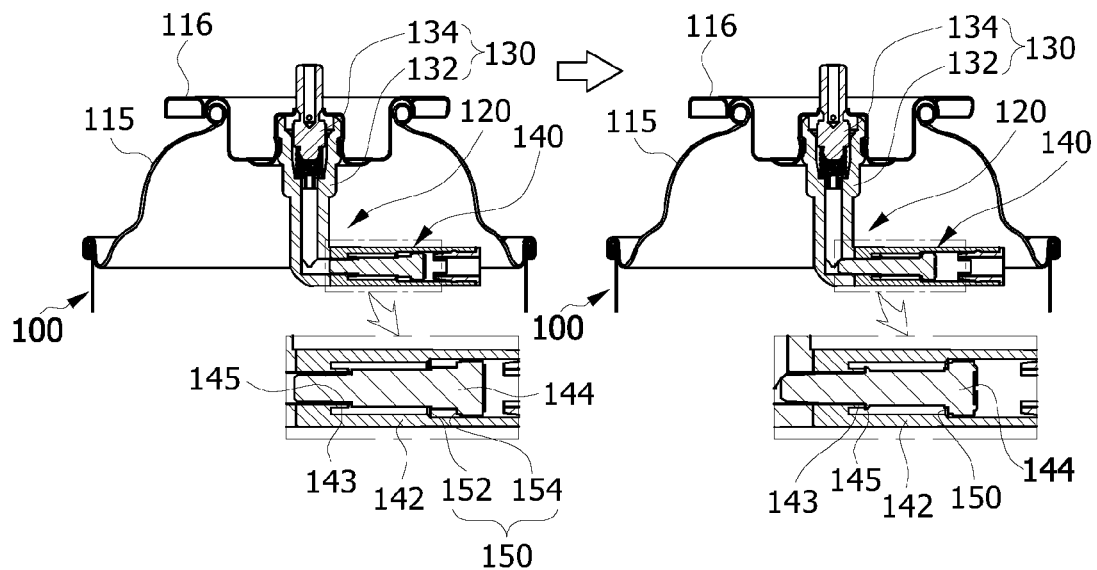
FIG. 6 is an operational view illustrating blocking of a flow path of the safety valve according to an embodiment of the present invention.
Figure 7:
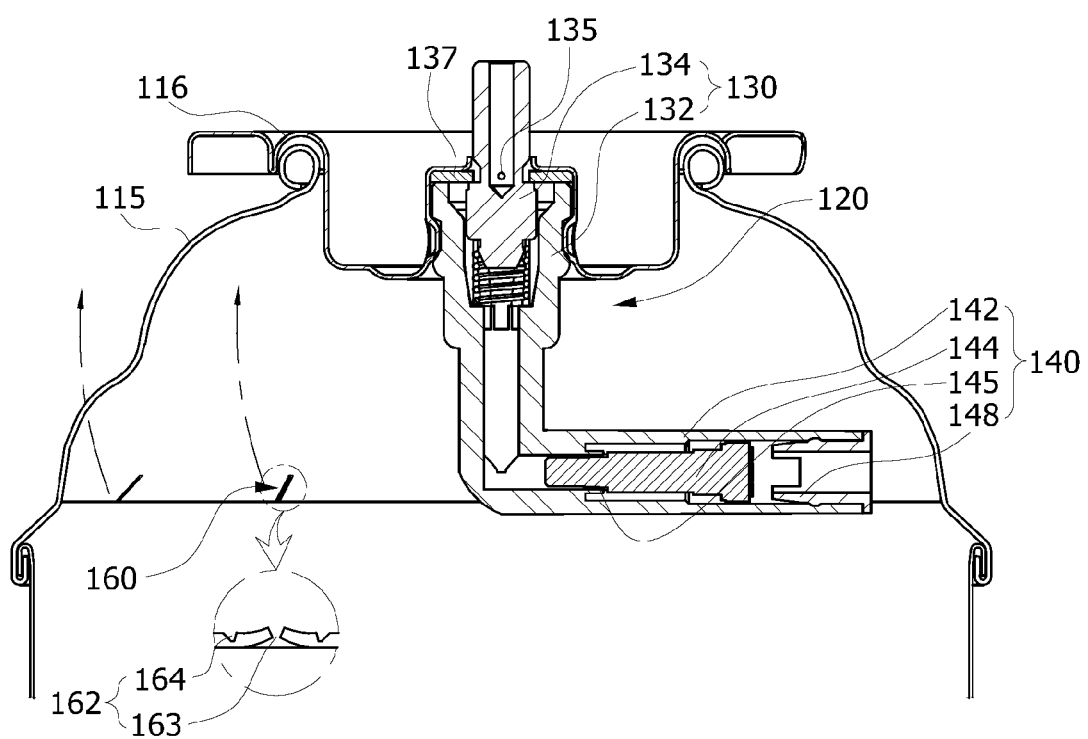
FIG. 7 is an operational view of a gas releasing part of the gas cylinder according to an embodiment of the present invention.

FIG. 1 is a perspective view illustrating a gas cylinder according to an embodiment of the present invention, FIG. 2 is a cross-sectional view of the gas cylinder according to an embodiment of the present invention, FIG. 3 is a cross-sectional view illustrating a safety valve according to an embodiment of the present invention, FIG. 4 is a view illustrating a blocking part of the safety valve according to an embodiment of the present invention, FIG. 5 is a cross-sectional view illustrating a state in which the safety valve according to an embodiment of the present invention is in normal use, FIG. 6 is an operational view illustrating blocking of a flow path of the safety valve according to an embodiment of the present invention, and FIG. 7 is an operational view of a gas releasing part of the gas cylinder according to an embodiment of the present invention.

Referring to FIGS. 1 to 7, a gas cylinder 100 according to an embodiment of the present invention includes a main body 110, a dome 115, an upper cap 116, a safety valve 120, and a gas releasing part 160.

The main body 110 includes a body 112 formed in a cylindrical shape and a lower cap 114 configured to cover a lower portion of the body 112. The main body 110 is formed of a metal material having a predetermined thickness or greater so as to have durability. The body 112 is formed in a cylindrical shape, and the dome 115 and the lower cap 114 are respectively coupled to both ends of the body 112 by seaming processing.

The upper cap 116 is coupled to the dome 115, and the safety valve 120 is disposed in the upper cap 116.

The safety valve 120 includes a valve part 130 and a blocking part 140. The valve part 130 discharges gas filled in the main body 110. The valve part 130 includes a valve housing 132, which is disposed in the upper cap 116 and has a flow path configured to allow communication between an inner portion and an outer portion of the main body 110, and a stem 134 disposed in the valve housing 132 and configured to selectively discharge gas inside the main body 110.

The valve housing 132 is coupled to the upper cap 116, and the stem 134 is disposed at the center of the valve housing 132. The stem 134 is elastically supported by an elastic member 136 in an inner space of the valve housing 132, and an orifice 135 passing through an outer periphery is formed in the stem 134. Further, a stem gasket 137 configured to block the orifice 135 is disposed between the upper cap 116 and the valve housing 132. Consequently, before the stem 134 is pressed, the stem gasket 137 is blocking the orifice 135 such that the gas inside the main body 110 is not discharged to the outside, and when the stem 134 is pressed due to an external force, the orifice 135 is opened and the gas inside the main body 110 is discharged to the outside.

The blocking part 140 is disposed in the valve part 130 and is configured to block a gas flow path in accordance with a temperature and pressure inside the main body 110. The blocking part 140 may block gas discharged to the outside through the stem 134 of the valve housing 132. That is, the blocking part 140 serves to remove a fire source by blocking the discharged gas.

The blocking part 140 includes an opening/closing flow path part 142 disposed inside the valve part 130, a blocking pin member 144 disposed in the opening/closing flow path part 142, an according blocking part 145 formed in the blocking pin member 144 and configured to cause the blocking pin member 144 to block the opening/closing flow path part 142 in accordance with the temperature inside the main body 110, and a separation preventing cap 148 disposed at an end of the valve part 130 and configured to prevent separation of the blocking pin member 144.

The according blocking part 145 may form a clearance which is formed in the blocking pin member 144 and through which gas flow is possible, and when the temperature inside the main body 110 reaches a set temperature, the according blocking part 145 may be molten and allow the blocking pin member 144 and the opening/closing flow path part 142 to be adhered to each other such that discharge of gas is blocked.

More specifically, as illustrated in FIGS. 3 and 4, the according blocking part 145 includes an adhering inclined surface 146 formed at the blocking pin member 144 and a gas distributing member 147 formed at the adhering inclined surface 146. The gas distributing member 147 may include a plurality of notches or ribs formed at the adhering inclined surface 146. That is, the according blocking part 145 is formed of a material that melts at a set temperature, and when the according blocking part 145 is molten due to a temperature rise, the blocking pin member 144 is moved forward from the opening/closing flow path part 142 due to a pressure inside the main body 110. In this way, discharge of gas is blocked due to adherence between the according blocking part 145 of the blocking pin member 144 and an inner surface of the opening/closing flow path part 142.

The blocking part 140 includes an auxiliary airtight part 150. The auxiliary airtight part 150 may include a first auxiliary airtight step 152 formed at the inner surface of the opening/closing flow path part 142 and a second auxiliary airtight step 154 formed at a peripheral surface of the blocking pin member 144 so as to correspond to and come into contact with the first auxiliary airtight step 152.

The auxiliary airtight part 150 may be formed in multiple stages, but this is merely a simple design change. Blocking performance may be improved by the auxiliary airtight part 150 along with the according blocking part 145.

A center ring fixing rib 144a configured to prevent eccentricity of the blocking pin member 144 at the opening/closing flow path part 142 is formed at the peripheral surface of the blocking pin member 144. The center ring fixing rib 144a is formed to protrude from a peripheral surface of a rear end of the blocking pin member 144 and is supported by the inner surface of the opening/closing flow path part 142.

The separation preventing cap 148 is formed to be hollow and is coupled to a rear end of the opening/closing flow path part 142. That is, the separation preventing cap 148 is hook-coupled to the rear end of the opening/closing flow path part 142 and prevents separation of the blocking pin member 144.

Further, an extending rib part 143 configured to improve an adhesive force with which the opening/closing flow path part 142 comes into contact with the according blocking part 145 is further disposed in the opening/closing flow path part 142. The extending rib part 143 is formed of a tube spaced apart from the inner surface of the opening/closing flow path part 142 at a front end of the opening/closing flow path part 142. Therefore, the extending rib part 143 may be somewhat widened when the blocking pin member 144 moves due to overpressure so that the adhesive force is improved and airtightness is improved.

The gas releasing part 160 may release overpressure gas in the main body 110 to the outside in accordance with the safety valve 120. More specifically, after the gas is shut off by the safety valve 120, the gas releasing part 160 releases overpressure gas to the outside in accordance with deformation of the dome 115 upon occurrence of overpressure in the main body 110. In this way, when the internal pressure further increases after the valve part 130 is blocked by the safety valve 120 upon the occurrence of overpressure, the gas releasing part 160 releases overpressure gas in the main body 110 to the outside in accordance with the pressure so that accidents such as explosion are prevented.

The gas releasing part 160 includes a plurality of pattern groove parts 162 formed at an edge of the dome 115 and configured to burst in accordance with deformation of the dome 115 upon occurrence of overpressure in the main body 110. The gas releasing part 160 has a form in which the plurality of pattern groove parts 162 are arranged along the edge of the dome 115. Further, the pattern groove parts 162 include a first groove 163 which bursts upon deformation of the dome 115 and second grooves 164 which are disposed at both sides of the first groove 163 and doubles the burst of the first groove 163.

The second grooves 164 serve to allow the first groove 163 to be torn by being sufficiently open. That is, as illustrated in FIGS. 1 and 7, the first groove 163 is formed to have a V-shaped cross-section, and the second grooves 164 are each formed to have a trapezoidal cross-section which is wide at the top and narrow at the bottom. In this way, since a higher stress acts toward the first groove 163 and may be expanded to a wider range upon deformation of the dome 115, the bursting is doubled.

Actions and effects of the safety valve according to an embodiment of the present invention having the above-described structure and a gas cylinder having the same will be described below.

When an operating piece of a gas stove is operated after the gas cylinder 100 according to the present embodiment is mounted in the gas stove, the stem 134 of the valve part 130 is pressed and gas filled in the main body 110 is discharged to the outside through the stem 134 at the same time.

As illustrated in FIG. 5, as the orifice 135, which was blocked by the stem gasket 137, is opened due to the movement of the stem 134, gas inside the main body 110 is discharged to the outside through the valve housing 132 and is used as a fire source.

In using such a portable gas stove, when the gas stove is atypically used without abiding by safety regulations such that the temperature of the main body 110 rises and overpressure occurs therein, the main body 110 is exposed to danger of explosion. Such danger may be prevented by the safety valve 120.

As illustrated in FIG. 6, when the temperature inside the main body 110 rises due to atypical use, the blocking pin member 144 of the opening/closing flow path part 142 is moved and blocks the opening/closing flow path part 142. In more detail, gas is smoothly discharged through the stem 134 by the gas distributing member 147 formed at the adhering inclined surface 146, and then when the temperature inside the main body 110 reaches a set temperature, the according blocking part 145 is softened, and the blocking pin member 144 is horizontally moved at the opening/closing flow path part 142 due to the pressure inside the main body 110. Therefore, the opening/closing flow path part 142 may be blocked and discharge of gas may be blocked so that fire of the gas stove is extinguished.

Since the according blocking part 145 is softened and the blocking pin member 144 is pressed toward the extending rib part 143 of the opening/closing flow path part 142 due to the pressure inside the main body 110, a high step may be formed at the according blocking part 145 as shown in an enlarged portion of FIG. 6 so that blocking reliability may be improved.

Since the auxiliary airtight parts 150 come into contact with each other due to the movement of the blocking pin member 144, blocking reliability may be improved by the auxiliary airtight parts 150 along with the according blocking part 145. In this case, the blocking pin member 144 may be guided in a straight line by the center ring fixing rib 144a formed at the peripheral surface of the rear end of the blocking pin member 144 and may be disposed at the exact center of the opening/closing flow path part 142.

Then, when a secondary temperature rise and overpressure additionally occur due to radiant heat of a cooking appliance, as illustrated in FIG. 7, as the edge of the dome 115 is deformed to be convex due to the overpressure, the gas releasing part 160 formed of the pattern groove parts 162 bursts, and overpressure gas is released to the outside. In this way, explosion of the main body 110 may be prevented. Also, since a fire source of the gas stove has already been removed by the safety valve 120, a user may be protected from flames.

The pattern groove parts 162 include the first groove 163 which bursts due to overpressure and the second grooves 164 which double the bursting of the first groove 163, thereby allowing a reliable operation. That is, since the dome 115 is deformed when the pressure inside the main body 110 reaches 1.3 to 1.71 MPa, and a higher stress may act toward the first groove 163 having a V-shaped cross-section and be expanded to a wider range due to the second grooves 164 having a trapezoidal cross-section formed to be adjacent to both sides of the first groove 163, the bursting is doubled.

Consequently, when the temperature inside the main body 110 rises and overpressure occurs due to an atypical use of the gas cylinder 100, firstly, a fire source of the gas stove may be removed by the safety valve 120, and when a temperature rise and overpressure occur due to radiant heat of the cooking appliance, secondly, the dome 115 may expand and be deformed to be convex and the first groove 163 may burst due to the deformation of the dome 115 such that an accident in which the gas cylinder 100 explodes may be prevented. Particularly, since the according blocking part 145 of the blocking pin member 144 configured to block the opening/closing flow path part 142 is softened due to the temperature rise and is able to block the opening/closing flow path part 142, operation reliability is improved and airtightness is excellent.

As described above, according to the safety valve and gas cylinder having the same according to an embodiment of the present invention, when the temperature inside the main body increases and overpressure occurs due to atypically using the safety valve and gas cylinder without abiding by safety regulations, the according blocking part is softened in accordance with the temperature rise and may block the flow path and remove a fire source of the gas stove, thereby preventing continuous temperature rise and overpressure. Further, even when a secondary temperature rise and overpressure occur due to radiant heat of the cooking appliance, overpressure gas may be discharged to the outside through the gas releasing part which bursts due to deformation of the dome, thereby preventing explosion of the main body. In addition, since the overpressure gas is discharged in a state in which the fire source has been removed by the safety valve, it is possible to provide a safe gas cylinder capable of protecting a user from flames.

The present invention has been described above with reference to the embodiments illustrated in the drawings, but the description is merely illustrative, and one of ordinary skill in the art to which the art pertains should understand that various modifications and other equivalent embodiments are possible from the description above.

Therefore, the actual technical scope of the present invention should be defined on the basis of the claims below.

The invention claimed is:
1. A safety valve comprising:
a valve part configured to discharge gas filled in a main body; and
a blocking part disposed in the valve part and configured to block a gas flow path in accordance with a temperature and pressure inside the main body; the blocking part including:
  an opening/closing flow path part disposed inside the valve part;
  a blocking pin member disposed in the opening/closing flow path part;
  an according blocking part formed in the blocking pin member and configured to cause the blocking pin member to block the opening/closing flow path part in accordance with the temperature inside the main body; and
  a separation preventing cap disposed at an end of the valve part and configured to prevent separation of the blocking pin member;
  wherein a center ring fixing rib configured to prevent eccentricity of the blocking pin member at the opening/closing flow path part is formed at a peripheral surface of the blocking pin member.

2. The safety valve of claim 1, wherein the according blocking part forms a clearance which is formed in the blocking pin member and through which a gas flow is possible and is molten when the temperature inside the main body reaches a set temperature.

3. The safety valve of claim 2, wherein the according blocking part includes:
an adhering inclined surface formed at the blocking pin member; and
a gas distributing member formed at the adhering inclined surface.

4. The safety valve of claim 1, wherein:
the blocking part includes an auxiliary airtight part; and
the auxiliary airtight part includes a first auxiliary airtight step formed at an inner surface of the opening/closing flow path part and a second auxiliary airtight step formed at a peripheral surface of the blocking pin member so as to correspond to and come into contact with the first auxiliary airtight step.

5. The safety valve of claim 1, wherein an extending rib part configured to improve an adhesive force with which the opening/closing flow path part comes into contact with the according blocking part is further disposed in the opening/closing flow path part.

6. A gas cylinder having a safety valve, the gas cylinder comprising:
a dome coupled to a main body;
an upper cap coupled to the dome;
the safety valve of claim 1 disposed in the upper cap, and
a gas releasing part configured to release overpressure gas of the main body to the outside in accordance with the safety valve.

7. The gas cylinder of claim 6, wherein the gas releasing part includes a plurality of pattern groove parts formed at an edge of the dome and configured to burst in accordance with deformation of the dome upon occurrence of overpressure in the main body.

8. A safety valve comprising:
a valve part configured to discharge gas filled in a main body; and
a blocking part disposed in the valve part and configured to block a gas flow path in accordance with a temperature and pressure inside the main body; the blocking part including:
  an opening/closing flow path part disposed inside the valve part;
  a blocking pin member disposed in the opening/closing flow path part;
  an according blocking part formed in the blocking pin member and configured to cause the blocking pin member to block the opening/closing flow path part in accordance with the temperature inside the main body; and
  a separation preventing cap disposed at an end of the valve part and configured to prevent separation of the blocking pin member;
  wherein an extending rib part configured to improve an adhesive force with which the opening/closing flow path part comes into contact with the according blocking part is further disposed in the opening/closing flow path part.

9. The safety valve of claim 8, wherein the according blocking part forms a clearance which is formed in the blocking pin member and through which a gas flow is possible and is molten when the temperature inside the main body reaches a set temperature.

10. The safety valve of claim 9, wherein the according blocking part includes:
an adhering inclined surface formed at the blocking pin member; and
a gas distributing member formed at the adhering inclined surface.

11. The safety valve of claim 8, wherein:
the blocking part includes an auxiliary airtight part; and
the auxiliary airtight part includes a first auxiliary airtight step formed at an inner surface of the opening/closing flow path part and a second auxiliary airtight step formed at a peripheral surface of the blocking pin member so as to correspond to and come into contact with the first auxiliary airtight step.

12. A gas cylinder having a safety valve, the gas cylinder comprising:
a dome coupled to a main body;
an upper cap coupled to the dome;
the safety valve of claim 8 disposed in the upper cap, and
a gas releasing part configured to release overpressure gas of the main body to the outside in accordance with the safety valve.

13. The gas cylinder of claim 12, wherein the gas releasing part includes a plurality of pattern groove parts formed at an edge of the dome and configured to burst in accordance with deformation of the dome upon occurrence of overpressure in the main body.

\* \* \* \* \*